May 6, 1958     G. CASTERA     2,833,513
GATE VALVE

Filed Jan. 18, 1956     2 Sheets-Sheet 1

George Castera
INVENTOR.

BY

May 6, 1958 G. CASTERA 2,833,513
GATE VALVE

Filed Jan. 18, 1956 2 Sheets-Sheet 2

George Castera
INVENTOR.

BY
Attorneys

United States Patent Office 2,833,513
Patented May 6, 1958

2,833,513

GATE VALVE

George Castera, Los Angeles, Calif., assignor to Snow Gates & Valves, Inc., Los Angeles, Calif., a corporation of California Application January 18, 1956, Serial No. 559,974

2 Claims. (Cl. 251—298)

This invention relates in general to new and useful improvements in valve construction, and more specifically to improvements in gate valve construction.

In order for a gate valve to function properly, it is necessary that the pivot for the gate element be located in alignment with the seat for the gate element. This can generally be accomplished by integrally forming the various portions of the gate valve. However, after being engaged for a period of time the seat becomes pitted and worn which requires the resurfacing thereof. Inasmuch as the seat has a portion thereof ground away during the surfacing operation, the seat is shifted with respect to the pivot for the gate element so that the two no longer remains in alignment. Once this occurs, the gate element does not properly seal against the seat and at times has a tendency to hang with respect to the seat thereby resist opening by water pressures thereon.

It is therefore the primary object of this invention to provide an improved gate valve which includes pivots for the gate element thereof which are so mounted whereby they may be adjusted with respect to the seat so that they may be retained in alignment with the face of the seat at all times irrespective of the reconditioning of the seat.

Still another object of this invention is to provide improved pivot lugs for pivots of a gate element of a gate valve which include mounting spacers attachable to a mounting frame of the gate valve, the spacers being machineable so as to reduce the thickness thereof whereby the amount removed from a seat of the gate valve during a reconditioning operation may be similarly removed from the spacers so that the pivot for the gate element may remain in alignment with the face of the seat.

A further object of this invention is to provide an improved gate valve which includes a mounting frame having pivotally connected thereto a pair of support links, a gate element being pivotally carried by the support links, and means for selectively connecting the gate element to the support links against pivoting whereby the gate valve may be selectively converted into a flap valve.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
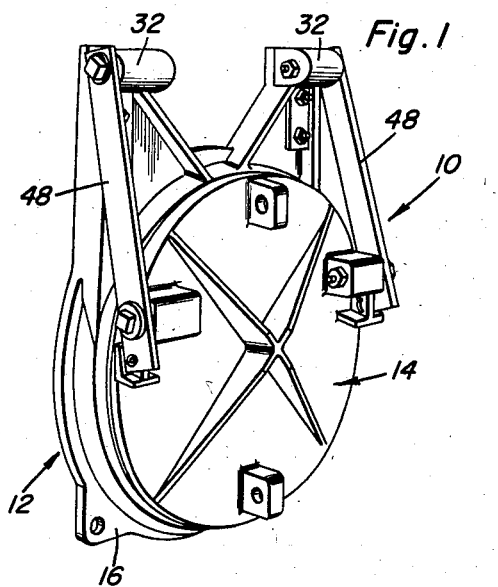
Figure 1 is a perspective view of the gate valve which is the subject of this invention and shows the same in a closed position.
Figure 6:
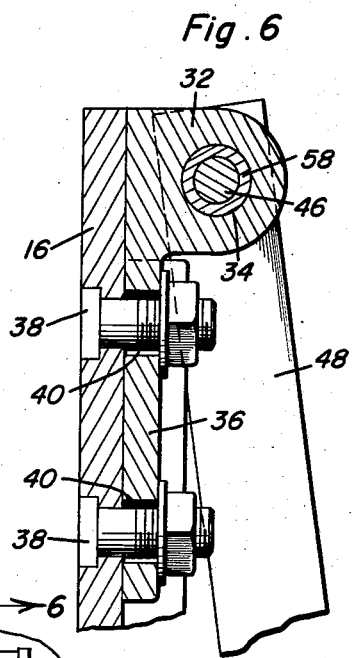
Figure 2:
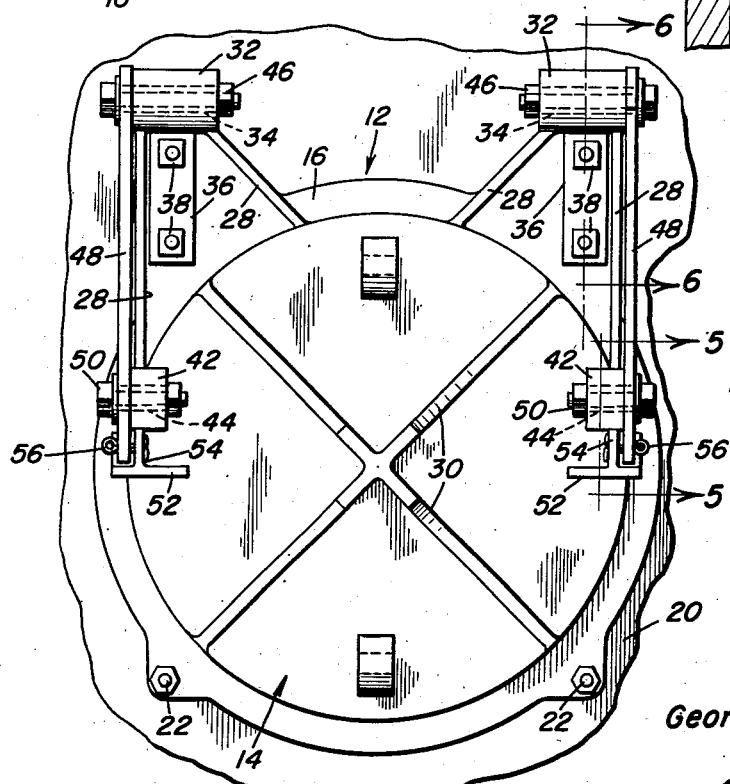
Figure 2 is an enlarged fragmentary elevational view of the end of a culvert and shows the gate valve of Figure 1 positioned relative to said culvert.
Figure 5:
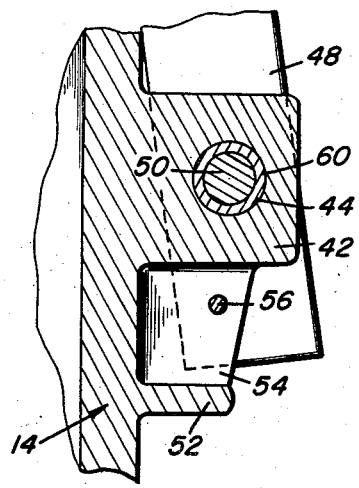

Figure 5 is an enlarged fragmentary vertical sectional view taken substantially upon a plane indicated by the section line 5—5 of Figure 2 and shows the specific connection between the gate element and the support link; and Figure 6 is an enlarged fragmentary vertical sectional view taken substantially upon the plane indicated by the section line 6—6 of Figure 2 and shows the manner in which the pivot lugs for the support links are removably secured to the mounting frame.

Referring now to the drawings in detail, it will be seen that there is illustrated the gate valve, which is the subject of this invention, the gate valve being referred to in general by the reference numeral 10. The gate valve 10 includes a mounting frame which is referred to in general by the reference numeral 12 and a gate element which is referred to in general by the reference numeral 14.

The mounting frame 12 includes a mounting flange 16 which has a flush face 18 disposed in abutting engagement with a face of the culvert 20. The mounting flange 16 has extending therethrough a plurality of fasteners 22 embedded in the culvert 20 to retain the mounting frame 12 in place. In order that the mounting frame 12 may be retained in sealed relation with respect to the culvert 20, there is formed integral with the mounting flange 16 an annular sealing flange 24 which is disposed within the culvert 20 and is sealed with respect to the conduit forming wall 26 thereof.

It is pointed out at this time that the mounting frame 12 may vary in details depending upon the particular type of conduit to which it is secured. Therefore, the sealing flange 24 may either be varied or omitted depending upon the type of conduit to which the mounting frame 12 is attached.

Extending from the opposite face of the mounting flange 16 in alignment with the sealing flange 24 is a seat 26. The seat 26 has disposed in alignment therewith the gate element 14 which cooperates with the seat 26 to form a seal. In order to prevent distortion of either the seat 26 or the gate element 14, the mounting frame 12 is provided with suitable reinforcing ribs 28 and the gate element 14 is provided with suitable reinforcing ribs 30 on the face thereof remote from the seat 26.

Figure 3:
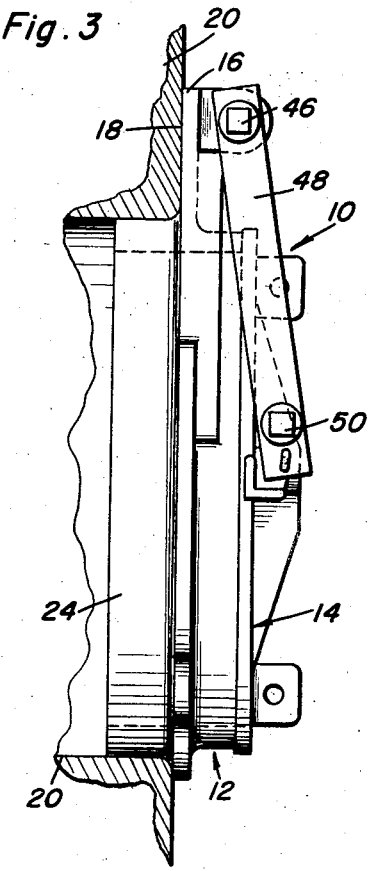
Figure 3 is an enlarged fragmentary vertical sectional view taken through the culvert with the gate valve being shown in elevation and in closed position.
Figure 4:
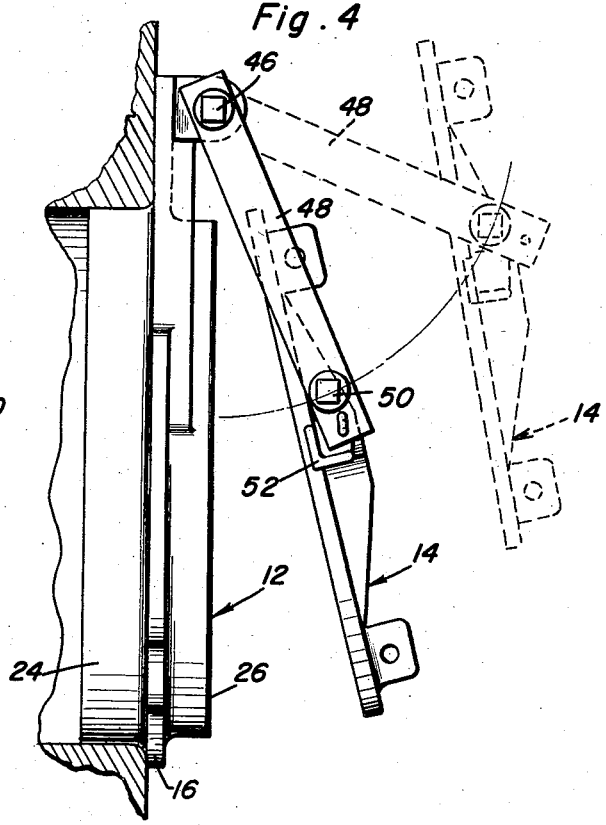
Figure 4 is an enlarged fragmentary sectional view similar to Figure 3 and shows the gate valve swung to a slightly opened position, the gate element being connected to the support links to function as a flap valve, a further open position of the gate element being shown in dotted lines with the gate element functioning as a conventional gate valve.

In order that the gate element 14 may be mounted for pivotal movement between a closed position, such as that illustrated in Figure 3 to an open position, such as is illustrated in Figure 4, there is carried by an upwardly projecting portion of the mounting flange 16 a pair of pivot lugs 32. The pivot lugs 32 extend generally transversely of the mounting frame 12 and have aligned bores 34. In order that the pivot lugs 32 may be secured to the mounting flange 16 for adjustment as desired, there is formed integral with the pivot lugs 32 spacers 36. The spacers 36 are disposed in face-to-face engagement with that face of the mounting flange 16 from which the seat 26 extends and are adjustably secured in place by suitable fasteners 38. The fasteners 38 are fixed with respect to the mounting flange 16 and are received in elongated slots 40 formed in the spacers 36. Thus the spacers 36 may be adjusted with respect to the mounting flange 16 as is deemed necessary to align the gate element 14 with the seat 26.

Carried by the gate element 14 at opposite sides thereof and above the center thereof are mounting ears 42. The mounting ears 42 are disposed generally in alignment with the pivot lugs 32 and have transversely aligned bores 44.

Received in the bores 34 are aligned pivot pins 46. Carried by the pivot pins 46 for pivotal movement are upper ends of support links 48. The lower ends of the support links 48 are connected to the gate element 14 for pivotal movement by pivot pins 50 which pass therethrough and are received in the bores 44 of the mounting ears 42. Inasmuch as the pivot pins 46 have their axes disposed in alignment with the plane of the seat 26 and since the axes of the pivot pins 50 are offset with respect to the plane of the seat 26 on the face of the gate element 14 remote from the face thereof which engages the seat 26, the gate element 14 will be gravity urged into flush face-to-face sealing engagement with the seat 26.

Carried by the gate element 14 immediately below the mounting ears 42 are generally inverted T-shaped brackets 52. The brackets 52 include vertical flanges 54 which are disposed adjacent the lower ends of the support links 48 which extend below the mounting ears 42. Selectively passed through the lower ends of the support links 48 and the vertical flanges 54 are pins 56 which lock the support links 48 to the gate element 14 to prevent relative pivoting therebetween. Thus the gate element 14 will swing with the support links 48 to function as a flap valve when desired. On the other hand, when the gate element 14 is permitted to pivot with respect to the support link 48, as illustrated in dotted lines in Figure 4, it will function as the conventional type of gate valve.

In order that the support links 48 will more freely swing with respect to the pivot pins 46, there is received in the bores 44 of the pivot lugs 32 suitable sleeve bearings 58. Similar sleeve bearings 60 are positioned in the bores 44 and receive the pivot pins 50.

As set forth above, inasmuch as the axes of the pivot pins 46 are disposed in alignment with the face of the seat 26 and since the axes of the pivot pins 50 are offset therefrom, the gate element 14 will be gravity urged into tight sealing engagement with the seat 26. However, after the seat 26 has become pitted or otherwise damaged so as to prevent a proper seal with the gate element 14, it is necessary that this seat be refaced. In order to accomplish this, it is necessary that the metal be ground from the face of the seat 26 until such time as the seat is once again full and will provide a proper seal with respect to the gate element 14. However, once the seat 26 has been refaced, it is no longer disposed in alignment with the axes of the pivot pins 46. Since the pivot pins 46 are now disposed outwardly of the face of the seat 26, the gate element 14 is not fully gravity urged into sealing engagement with the seat 26. If the pivot lugs 32 were formed integral with the mounting flange 16 as in the past, it would be practically impossible to relocate the pivot pins 46 in alignment with the face of the seat 26. However, by making the pivot lugs 32 separate from the mounting flange 16 and by utilizing the spacers 36 which may be machined, the pivot pins 46 may be shifted in accordance with the refinishing of the seat 26 to again be in alignment therewith.

This permits the pivot pins 46 to be retained in alignment with the face of the seat 26 at all times irrespective of the machining of the seat 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gate valve comprising a mounting frame and a gate element, said mounting frame including a mounting flange, conduit sealing means connected to said mounting flange on one face thereof, a projecting seat of sufficient thickness as to allow refinishing connected to said mounting flange on the opposite face thereof, elongated spacers of sufficient thickness as to allow refinishing, pivot lugs carried by said spacers in projecting relation, means releasably securing said spacers to said opposite face above said seat, first pivot pins having aligned axes disposed in the plane of said seat, support links carried by said first pivot pins in depending relation, said gate element having a seat engaging face, mounting ears on said gate element, aligned second pivot pins carried by said mounting ears, said second pivot pins connecting said gate element to said support links, said spacers having mounting faces parallel to said seat whereby said mounting faces may be refinished together with said seat to retain the desired aligned relationship between said seat and said gate element.

2. A gate valve comprising a mounting frame and a gate element, said mounting frame including a mounting flange, conduit sealing means connected to said mounting flange on one face thereof, a seat of sufficient thickness as to allow refinishing connected to said mounting flange on the opposite face thereof, elongated spacers of sufficient thickness as to allow refinishing, pivot lugs carried by said spacers in projecting relation, means releasably securing said spacers to said opposite face above said seat, first pivot pins having aligned axes disposed in the plane of said seat, support links carried by said first pivot pins in depending relation, said gate element having a seat engaging face, mounting ears on said gate element, aligned second pivot pins carried by said mounting ears, said second pivot pins connecting said gate element to said support links, and means for locking said support links to said gate element to prevent relative pivoting between said gate element and said support links.

References Cited in the file of this patent

UNITED STATES PATENTS

| 1,168,579 | Thorsby | Jan. 18, 1916 |
| 2,176,522 | Brown | Oct. 17, 1939 |